(12) United States Patent
Popovich et al.

(10) Patent No.: US 6,646,636 B1
(45) Date of Patent: Nov. 11, 2003

(54) DISPLAY SYSTEM UTILIZING AMBIENT LIGHT AND A DEDICATED LIGHT SOURCE (75) Inventors: Milan M. Popovich, Leicester (GB); Ronald T. Smith, Corona del Mar, CA (US)

(73) Assignee: DigiLens Inc., Sunnyvale, CA (US)

( * ) Notice: Subject to any disclaimer, the term of this patent is extended or adjusted under 35 U.S.C. 154(b) by 315 days.

(21) Appl. No.: 09/693,270

(22) Filed: Oct. 19, 2000

Related U.S. Application Data (60) Provisional application No. 60/162,525, filed on Oct. 29, 1999.

(51) Int. Cl.[7] .................................................. G09G 5/00
(52) U.S. Cl. ........................ 345/204; 345/102; 359/15
(58) Field of Search ............................... 345/204, 102, 345/207; 349/113, 177, 201–202; 359/13, 15, 24

(56) References Cited

U.S. PATENT DOCUMENTS

| | | | |
|---|---|---|---|
| 4,566,031 A | 1/1986 | Kirk | 358/90 |
| 5,063,379 A | 11/1991 | Fabry et al. | 340/784 |
| 5,291,314 A | 3/1994 | Agranat et al. | 5/23 |
| 5,381,253 A | 1/1995 | Sharp et al. | 359/53 |
| 5,471,327 A | 11/1995 | Tedesco et al. | 359/15 |
| 5,497,254 A | 3/1996 | Amako et al. | 359/53 |
| 5,506,701 A | 4/1996 | Ichikawa | 359/15 |
| 5,521,724 A | 5/1996 | Shires | 359/22 |
| 5,552,912 A | 9/1996 | Sharp et al. | 359/73 |
| 5,552,916 A | 9/1996 | O'Callaghan et al. | 359/95 |
| 5,570,139 A | 10/1996 | Wang | 348/744 |
| 5,680,231 A | 10/1997 | Grinberg et al. | 359/15 |
| 5,706,067 A | 1/1998 | Colgan et al. | 349/114 |
| 5,708,488 A | 1/1998 | Fukui et al. | 349/76 |
| 5,745,203 A | 4/1998 | Valliath et al. | 349/113 |
| 5,796,499 A | 8/1998 | Wenyon | 359/16 |
| 5,801,798 A | 9/1998 | Chen et al. | 349/74 |
| 5,801,799 A | 9/1998 | Chen et al. | 349/74 |
| 5,808,759 A | 9/1998 | Okamori et al. | 359/15 |
| 5,825,448 A | 10/1998 | Bos et al. | 349/127 |
| 5,844,709 A | 12/1998 | Rabinovich et al. | 359/248 |
| 5,844,711 A | 12/1998 | Long, Jr. | 359/291 |
| 5,868,480 A | 2/1999 | Zeinali | 353/31 |
| 5,926,293 A | 7/1999 | Ralli | 395/15 |
| 5,936,751 A | 8/1999 | Wenyon | 359/15 |
| 5,942,157 A | 8/1999 | Sutherland et al. | 252/582 |
| 6,115,152 A | 9/2000 | Popovich et al. | 359/15 |
| 6,144,359 A * | 11/2000 | Grave | 345/102 |
| 6,317,228 B2 * | 11/2001 | Popovich et al. | 359/15 |

* cited by examiner

Primary Examiner—Richard Hjerpe
Assistant Examiner—Francis Nguyen
(74) Attorney, Agent, or Firm—Yi Van Pelt (57) ABSTRACT A display system generally comprising a display device operable to display an image and configured for illumination by ambient light or light emitted by a dedicated light source and a light directing system. The light directing system is operable to direct one of the ambient light and the light emitted by the light source towards the display device. The light directing system comprises at least one holographic optical element which is switchable between an active state wherein light incident on the element is diffracted and a passive state wherein light incident on the element is transmitted without substantial alteration.

7 Claims, 6 Drawing Sheets

DISPLAY SYSTEM UTILIZING AMBIENT LIGHT AND A DEDICATED LIGHT SOURCE

RELATED APPLICATIONS

The present application claims the benefit of U.S. Provisional Application Serial No. 60/162,525, filed Oct. 29, 1999.

BACKGROUND OF THE INVENTION

The present invention relates generally to display systems, and more particularly, to a display system operable to use either ambient light or light from a dedicated light source.

Display systems typically include a display surface having an array of pixels for displaying data or images in accordance with signals generated by an image control circuit. The display surface may comprise, for example, a liquid crystal display (LCD) panel, or any other spatial light modulator (SLM) which reflects or transmits light produced eternally. The display system may be a microdisplay for use with a computer, head mounted display, handheld device, or any other device having a display screen for displaying images. Conventional display systems include a dedicated light source to illuminate the display surface. The display screen is, however, often located within a well lighted area. It would be desirable to utilize ambient light when the ambient light is sufficiently bright to produce an image. This would allow the display system to conserve energy and increase the useful life of the light source. However, conventional optics for directing ambient light onto a display are typically complex and require too much space to use with compact display systems based on microdisplays.

There is, therefore, a need for compact display system operable to switch between ambient light and light from a light source of the display system.

SUMMARY OF THE INVENTION

A display system of the present invention generally comprises a display device operable to display an image and configured for illumination by ambient light or light emitted by a dedicated light source. The display system further comprises a light directing system operable to direct one of the ambient light and the light emitted by the light source towards the display device. The light directing system comprises at least one holographic optical element which is switchable between an active state wherein light incident on the element is diffracted and a passive state wherein light incident on the element is transmitted without substantial alteration.

The display device may be transmissive or reflective and is preferably mounted on one end of a light guide. The light directing system may comprise a reflective holographic optical element and a transmissive holographic optical element, for example.

In another aspect of the invention, a display system generally comprises a display device operable to display an image, a light source, and a light directing system. The light directing system is operable is switchable between an ambient light mode wherein the display device is illuminated by ambient light and an internal illumination mode wherein the display device is illuminated by the light source. The light directing system comprises at least one holographic optical element.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
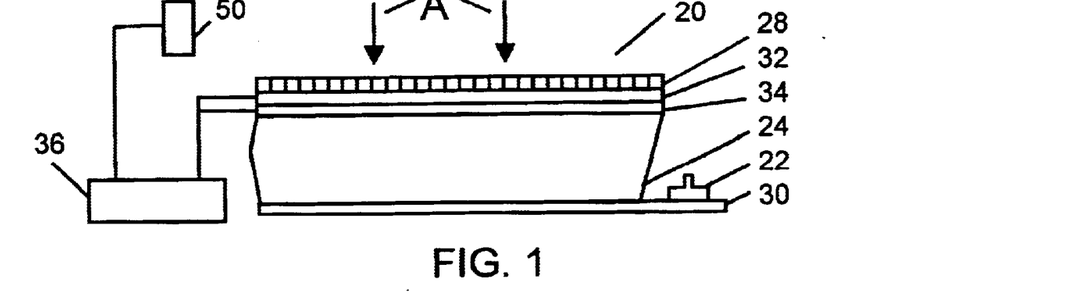
FIG. 1 is side view of a first embodiment of a display system of the present invention having a transmissive display device.
Figure 12:
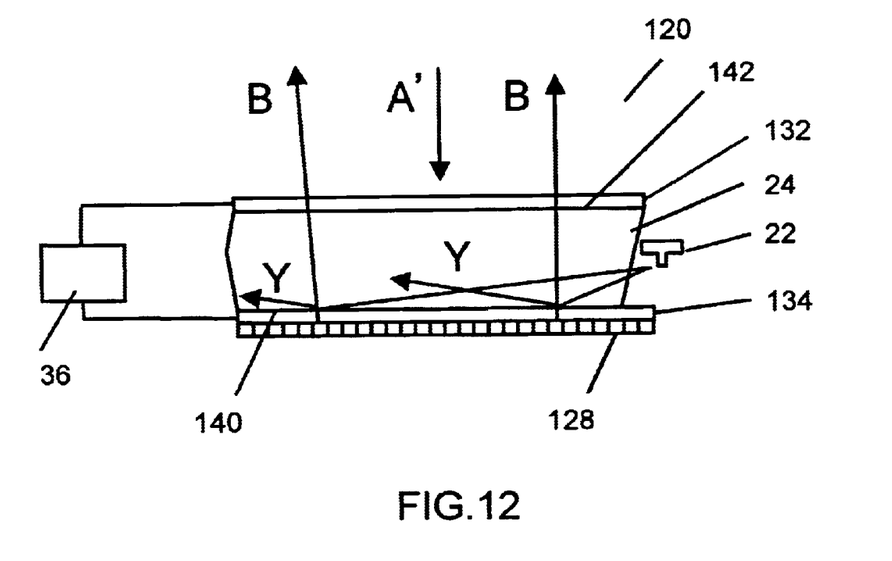
FIG. 12 is a side view of a fourth embodiment of a display system of the present invention having a reflective display device.

A display system of the present invention is operable to use either ambient light (indicated by arrows A) or a dedicated light source 22 (FIG. 1). The display system may, for example, use ambient light to conserve energy when the ambient light is sufficiently bright and switch to the dedicated light source 22 when the ambient light is not sufficient to illuminate the display screen. The display system may be used for a microdisplay or any other type of display used for a computer, television, wearable display, handheld device, or any device having a display screen. As further described below with respect to the different embodiments, the display system may use a transmissive display screen 28 or a reflective display screen 128 (FIGS. 1 and 12). The display screen may be positioned at a rear surface of a light guide 24 or a back surface of the light guide. The display screen may be configured for displaying a monochrome image or may be configured to display multicolor images. The display system may also be operable to diffuse ambient light or light from the dedicated light source.

The display system generally comprises a display device (which may be either transmissive or reflective), dedicated light source 22, light guide 24, and a light directing system operable to selectively direct either ambient light or light from the light source to the display device. The light directing system includes at least one switchable holographic optical element and a controller operable to switch the holographic optical element between an active state in which the element diffracts light incident upon a surface thereof and a passive state in which the light is not substantially altered.

The display device 28, 128 typically comprises an array of pixels for displaying monochromatic data or monochromatic images in accordance with signals generated by an image control circuit (not shown). The display device may comprise a liquid crystal display (LCD) panel, or any other spatial light modulator (SLM) which reflects or transmits light produced externally. The display device 28, 128 may be a miniature reflective LCD having either a nematic or ferroelectric material on a silicon backplane, for example. The display may also be based on transmissive display technologies. A micro-electromechanical system, such as a Digital Light Processor (DLP) using a Digital Micromirror Device™ (DMD) available from Texas Instruments, may also be used as the display surface. The DMD is a micromechanical silicon chip having movable mirrors which reflect light to create high quality images. An image is formed on the reflective surface of the DMD by turning the mirrors on or off digitally at a high speed. An image is generated by color sequentially illuminating the display and turning individual mirrors on or off for durations which depend on the amount of each primary color required to generate the required color value at each pixel.

The display 28, 128 may also be a diffractive display device such as a Grating Light Valve™ (GLV) available from Silicon Light Machines (formerly Echelle, Inc.). The GLV uses micro-electromechanical systems to vary how light is reflected from multiple ribbon structures which can move small distances to create a grating that selectively diffracts specified wavelengths of light. Picture elements (pixels) are formed on the surface of a silicon chip and become the image source for display projection. It is to be understood that the display devices described above are merely examples and different display devices may be used without departing from the scope of the invention.

The light source 22 may be polychromatic and preferably provides incoherent white light. The white light includes red, green, and blue bandwidth light components (i.e., light beams having different wavelength ranges). Other light sources such as LED (light emitting diodes) may also be used, as described below.

A first embodiment of the present invention is shown in FIG. 1, and generally indicated at 20. The system 20 includes a transmissive display surface 28 on which an image is displayed for viewing by an observer. The display surface 28 is illuminated by ambient light from the surroundings, as generally indicated by arrows A. The display device 28 may also be illuminated by light emitted from the miniature incoherent white light source 22. Illumination of the display surface 28 is controlled by a light directing system which is disposed optically behind the display surface (with respect to the direction of incidence of the ambient light). The light directing system comprises a reflective holographic optical element 32 and a transmissive holographic optical element 34. The display device 28 and the light directing system are mounted on a front surface of the light guide 24 which is mounted on a substrate 30. The light guide 24 may be formed from a glass or plastic slab, for example.

Figure 3:
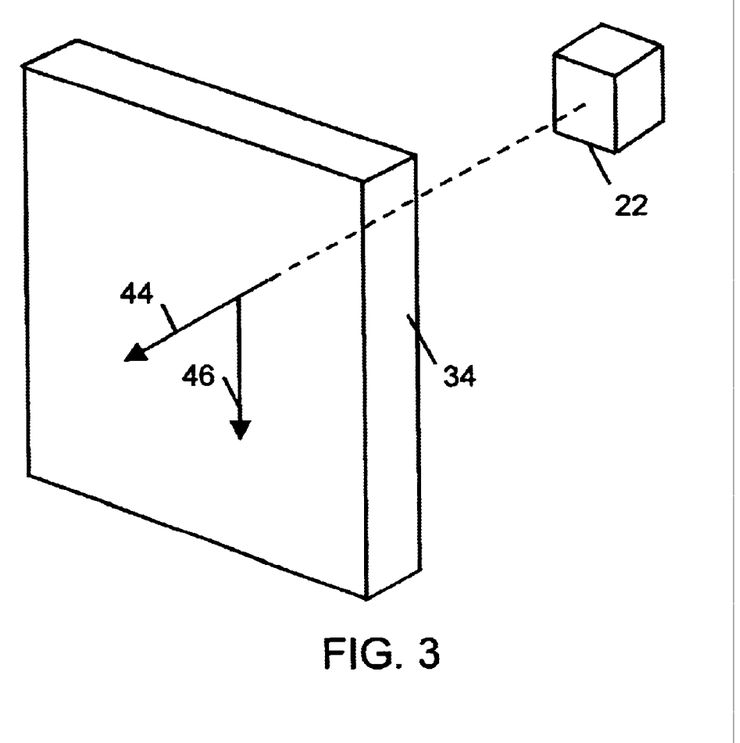
FIG. 3 is a perspective of a holographic optical element and light source for use with the display system of FIG. 1.
Figure 4:
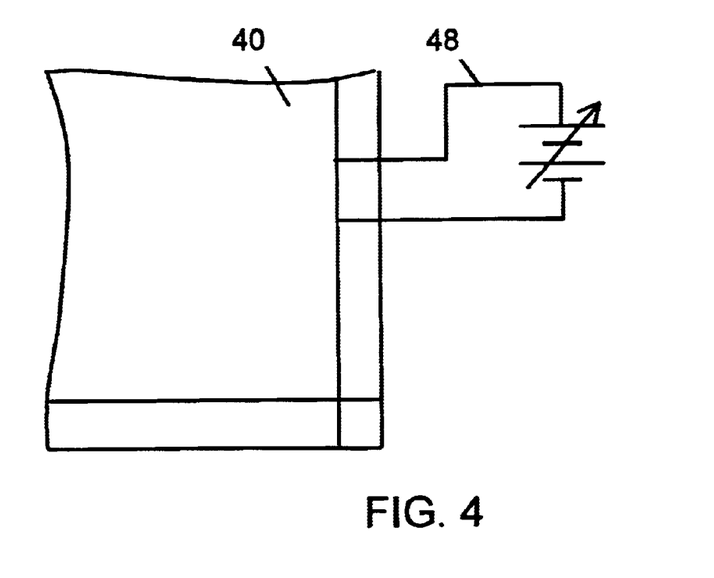
FIG. 4 is a partial front view of the holographic optical element of FIG. 3 illustrating an electrode and electric circuit of the holographic optical element.

The holographic elements 32, 34 are each switchable between an active (diffracting) state and a passive (non-diffracting) state. It is to be understood that in the passive state (non-diffracting state), the incoming light may still be slightly diffracted, however, the light is not substantially altered. Switching of the holographic elements 32, 34 is controlled by controller 36, which operates to switch each of the elements between their active and passive states. The holographic optical elements 32, 34 each include a hologram interposed between two electrodes 40 (FIGS. 3 and 4). The hologram may be a Bragg (thick or volume) hologram or Raman-Nath (thin) hologram. Raman-Nath holograms are thinner and require less voltage to switch light between various modes of the hologram, however, Raman-Nath holograms are not as efficient as Bragg holograms. The Bragg holograms provide high diffraction efficiencies for incident beams with wavelengths close to the theoretical wavelength satisfying the Bragg diffraction condition and within a few degrees of the theoretical angle which also satisfies the Bragg diffraction condition.

The hologram is used to control transmitted light beams based on the principles of diffraction. The hologram selectively directs an incoming light beam from light source 22 either towards or away from a viewer and selectively diffracts light at certain wavelengths into different modes in response to a voltage applied to the electrodes 40. Light passing through the hologram in the same direction as the light is received from the light source 22 is referred to as the zeroth (0th) order mode 44 (FIG. 3). When no voltage is applied to the electrodes 40, liquid crystal droplets within the holographic optical element 32, 34 are oriented such that the hologram is present in the element and light is diffracted from the zeroth order mode to a first (1st) order mode 46 of the hologram. When a voltage is applied to the holographic optical element 32, 34, the liquid crystal droplets become realigned effectively erasing the hologram, and the incoming light passes through the holographic optical element in the zeroth order mode 44.

The light that passes through the hologram is diffracted by interference fringes recorded in the hologram. Depending on the recording, the hologram is able to perform various optical functions which are associated with traditional optical elements, such as lenses and prisms, as well as more sophisticated optical operations. The hologram may be configured to perform operations such as deflection, focusing, or color filtering of the light, for example.

The holograms are preferably recorded in a photopolymer/liquid crystal composite material (emulsion) such as a holographic photopolymeric film which has been combined with liquid crystal, for example. The presence of the liquid crystal allows the hologram to exhibit optical characteristics which are dependent on an applied electrical field. The photopolymeric film may be composed of a polymerizable monomer having dipentaerythritol hydroxypentacrylate, as described in PCT Publication, application Ser. No. PCT/US97/12577, by Sutherland et al, which is incorporated herein by reference in its entirety. The liquid crystal may be suffused into the pores of the photopolymeric film and may include a surfactant.

The diffractive properties of the holographic optical elements 32, 34 depend primarily on the recorded holographic fringes in the photopolymeric film. The interference fringes may be created by applying beams of light to the photopolymeric film. Alternatively, the interference fringes may be artificially created by using highly accurate laser writing devices or other replication techniques, as is well known by those skilled in the art. The holographic fringes may be recorded in the photopolymeric film either prior to or after the photopolymeric film is combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the switchable holographic optical elements.

The electrodes (electrode layers) 40 are positioned on opposite sides of the emulsion and are preferably transparent so that they do not interfere with light passing through the hologram (FIG. 4). The electrodes 40 may be formed from a vapor deposition of Indium Tin Oxide (ITO) which typically has a transmission efficiency of greater than 80%, or any other suitable substantially transparent conducting material. The transmission may be increased to above 98% by adding suitable antireflection coatings to the electrodes. An anti-reflection coating (not shown) may be applied to selected surfaces of the switchable holographic optical element, including surfaces of the ITO and the electrically nonconductive layers, to improve the overall transmissive efficiency of the optical element and to reduce stray light. The electrodes 40 are connected to an electric circuit 48 operable to apply a voltage to the electrodes, to generate an electric field (FIG. 4). Initially, with no voltage applied to the electrodes 40, the hologram is in the diffractive (active) state and the holographic optical element 32, 34 diffracts propagating light in a predefined manner. When an electrical field is generated in the hologram by applying a voltage to the electrodes 40 of the holographic optical element 32, 34, the operating state of the hologram switches from the diffractive state to the passive state and the holographic optical element does not optically alter the propagating light. It is to be understood that the electrodes may be different than described herein without departing from the scope of the invention. For example, a plurality of smaller electrodes may be used rather than two large electrodes which substantially cover surfaces of the holograms.

It is to be understood that the holographic diffraction elements 32, 34 may be different than described herein without departing from the scope of the invention. The display system 20 may also include additional holographic elements that perform optical functions other than light directing, as described below.

Figure 2A:
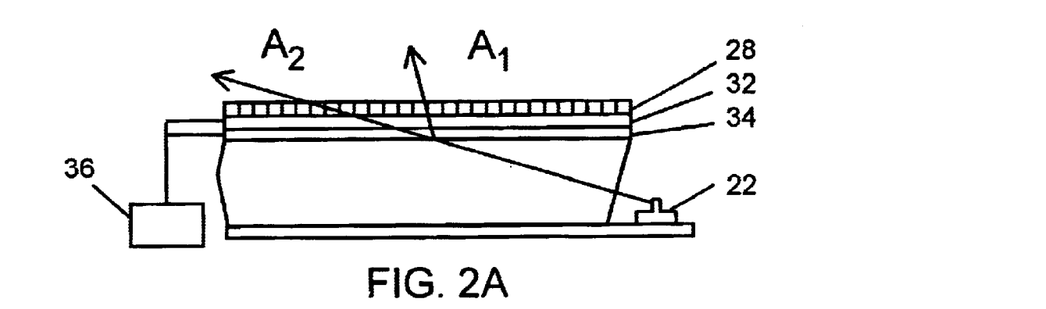
FIG. 2A is a side view of the display system of FIG. 1 illustrating a first operating mode.

When the transmissive holographic optical element 34 is activated it directs light from the light source 22 through the display device 28 (in a direction generally perpendicular to the display surface as indicated by arrow $A_1$, in FIG. 2A. When the transmissive element 34 is deactivated, it allows light from the light source 22 to pass straight through (as indicated by arrow $A_2$ in FIG. 2A) and the light is emitted from the display screen 28. When the reflective holographic optical element 32 is activated, it reflects ambient light back through the display device 28, as indicated by arrow $B_1$ in FIG. 2B. When the reflective element 32 is deactivated, it allows the ambient light to pass straight through, as indicated by arrow $B_2$ in FIG. 2B.

Figure 2B:
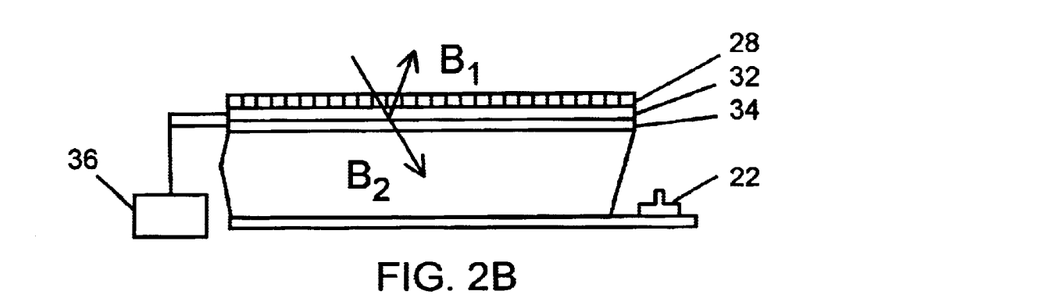
FIG. 2B is a side view of the display system of FIG. 1 illustrating a second operating mode.

The display system 20 is thus configured to operate in two modes; internal illumination mode (FIG. 2A) and ambient light mode (FIG. 2B). In internal illumination mode the reflective holographic optical element 32 is deactivated and the transmissive holographic optical element 34 is activated, thereby causing the display surface 28 to be illuminated by light emitted from the dedicated light source 22. In the ambient light mode, the reflective holographic optical element 32 is activated and the transmissive holographic optical element 34 is deactivated. This causes the display device 28 to be illuminated by ambient light reflected by the reflective holographic optical element 32. The controller 36 switches the elements 32, 34 between these two modes of operation. The controller 36 may be manually controlled or the controller may be connected to a sensor 50 which detects ambient light levels (FIG. 1). For example, the controller 36 may be programmed to switch the display system 20 from ambient light mode to internal illumination mode when the ambient light level falls below a predetermined threshold.

Figure 2C:
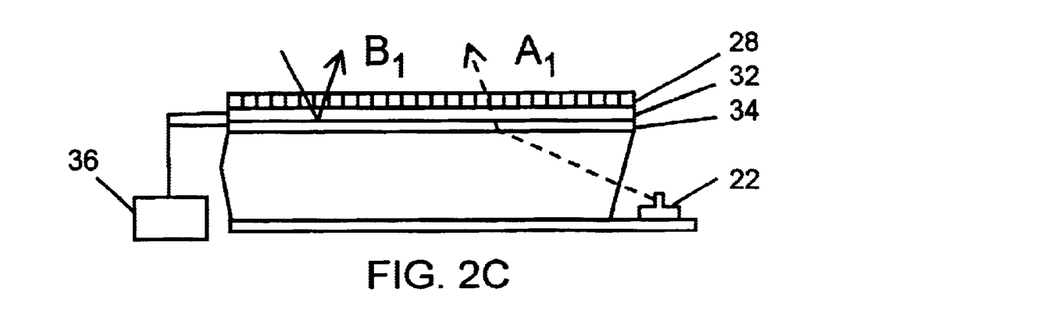
FIG. 2C is a side view of the display system of FIG. 1 illustrating a third operating mode.

The display system 20 may also be configured to operate in a third mode, as shown in FIG. 2C. In this mode, the controller 36 rapidly switches the two holographic optical elements 32, 34 between their active and passive states such that one element is in its active state while the other element is in its passive state. The display surface 28 is therefore illuminated in rapid alternating succession by ambient light and light from the dedicated light source 22. The switching is preferably performed at a fast rate as compared to the response of an observer's eye so that the modulation of the light is not perceived by the observer. In this mode, the observer perceives the display surface 28 as being illuminated at the same time by both ambient light and the dedicated light source 22.

Figure 5:
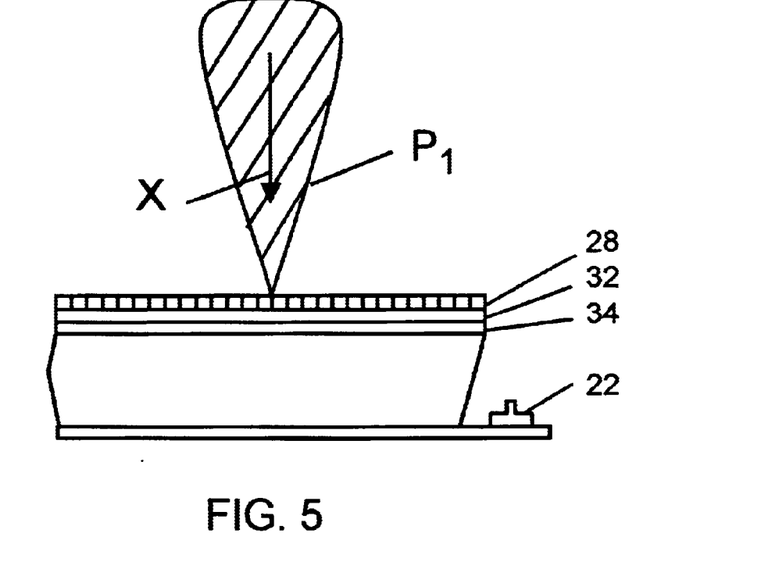
FIG. 5 is a diagram illustrating a polar distribution of light emitted from the display system of FIG. 1.

In the display system 20, the characteristics of the reflective holographic optical element 32 may be selected such that the ambient light is reflected along vectors that are centered generally perpendicular to the display surface. In FIG. 5 the direction of incidence of the ambient light is indicated by arrow X and the distribution of reflected light is indicated by polar diagram $P_1$. The required light distribution may be achieved by configuring the holographic optical element 32 to act as a conventional mirror. The element 32 may also be configured to include diffusing properties which provide improved control over the shape of the polar diagram $P_1$.

Figure 6:
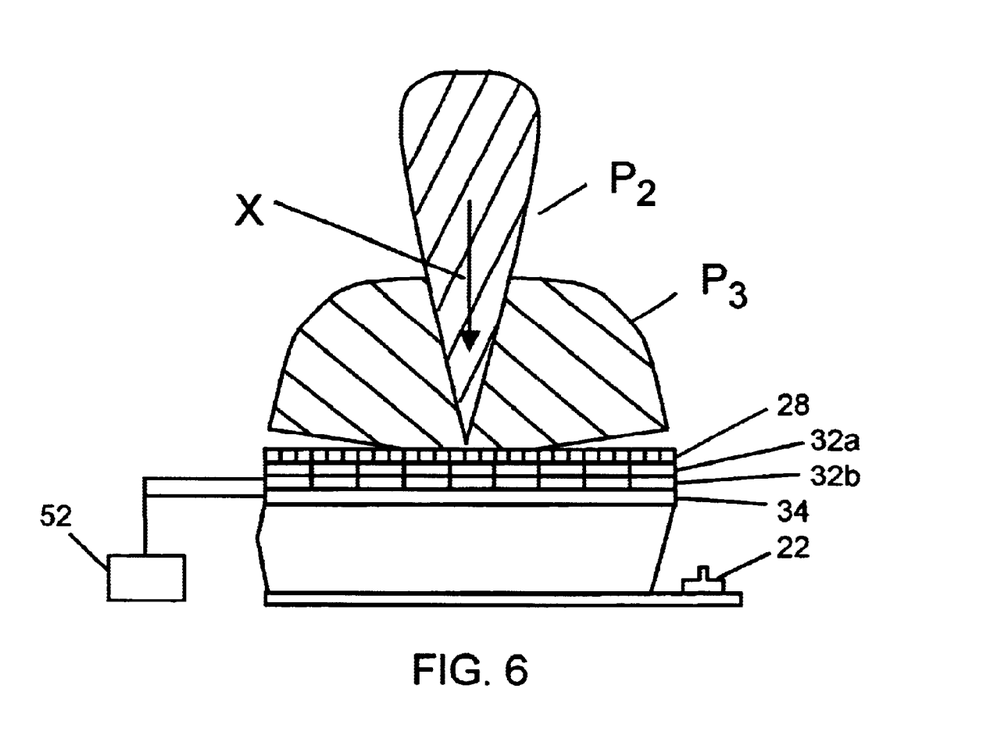
FIG. 6 is a diagram illustrating two different polar distributions of light emitted from the display system of FIG. 1.

For example, the reflective holographic optical element 32 may be replaced with two independently switchable holographic optical elements 32a, 32b, which have different diffusion characteristics, as shown in FIG. 6. These elements 32a, 32b are switchable between active and passive states by a controller 52. (which may be integrated into controller 36).

When holographic optical element 32a is activated, the distribution of reflected light is a relatively narrow polar distribution $P_2$. When holographic optical element 32b is activated it produces a broader polar distribution $P_3$. This allows the display system 20 to be switched between a private viewing mode (e.g., polar distribution $P_2$) and a public viewing mode (e.g., polar distribution $P_3$). This change in diffusion characteristics may also be applied to the transmissive holographic optical element 34 to achieve a suitable angular distribution in the light deflected from light source 22 and passing through the display surface 28. Holographic optical element 34 may similarly be replaced with a plurality of independently switchable components, each having different diffusion characteristics.

Figure 7:
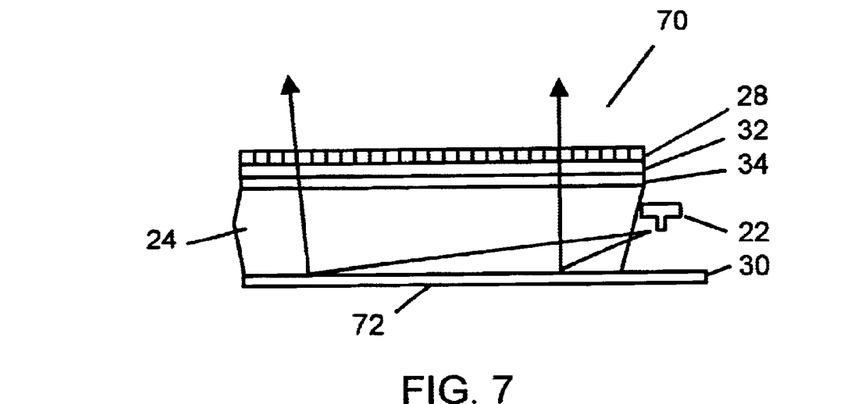
FIG. 7 is a side view of a second embodiment of a display system of the present invention having a reflective surface at a rear surface of a light guide.
Figure 8:
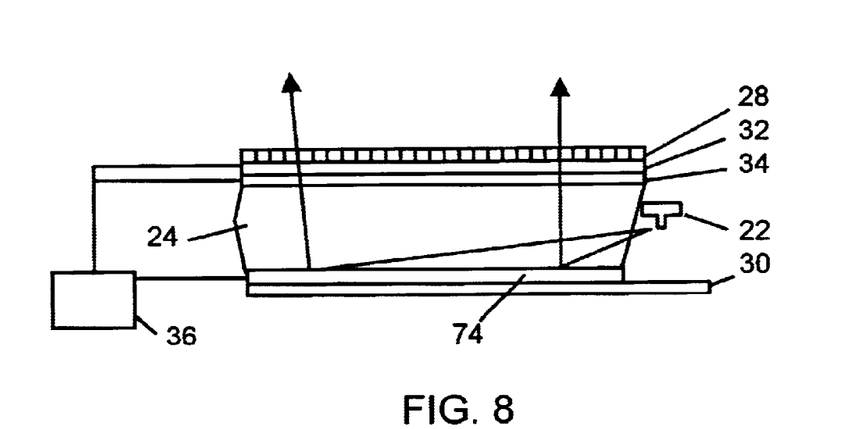
FIG. 8 is a side view of the display system of FIG. 7 with a reflective holographic element disposed at the rear surface of the light guide.

The first embodiment of the display system 20 may include additional optics which control the divergence and average ray direction of light from light source 22 so that the light impinges upon the holographic optical element 34 at as small an incident angle as possible. This will generally reduce the size of the display system 20. FIG. 7 illustrates an alternative way to achieve this effect. A second embodiment of the display system is shown in FIG. 7 and generally indicated at 70. A reflective surface 72 is interposed between the light guide 24 and the substrate 30 and light emitted from the light source 22 is directed at the reflective surface. The light from light source 22 thus reaches holographic optical element 34 after being reflected from the reflective surface 72. The reflection may be achieved by total internal reflection within the light guide 24 or a reflective holographic optical element 74 may be interposed between the light guide 24 and substrate 30, as shown in FIG. 8. The element 74 is switchable between active and passive states by controller 36. When the display system 70 is in its internal illumination mode, the element 74 is activated and directs light from the light source 22 towards the display device 28. When the display system 70 is in its ambient light mode, the element 74 is deactivated so that light from the light source 22 does not reach the display surface 28. The reflective element 74 is switched generally in synchronism with the transmissive element 34, such that both elements are activated and deactivated together. The element 74 may also be non-switchable and the light source 22 turned off when the display system 20 is in ambient light mode. Holographic optical element 34 may also be removed.

Figure 9:
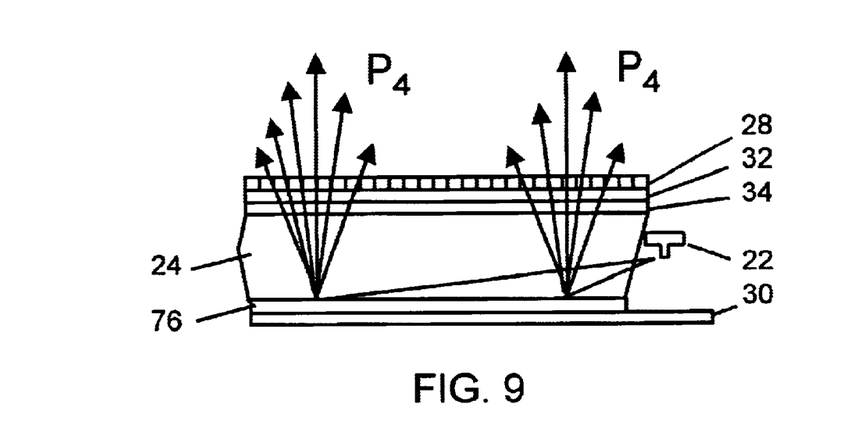
FIG. 9 is a side view of the display system of FIG. 7 with a holographic diffuser disposed at the rear surface of the light guide.

FIG. 9 illustrates the display system of FIG. 7 with a diffuser 76 interposed between the light guide 24 and substrate 30. The diffuser 76 is configured to generate a specific polar diagram, as indicated by arrows $P_4$. The diffuser 76 may comprise two or more switchable holographic elements so that different polar diagrams can be generated.

Figure 10:
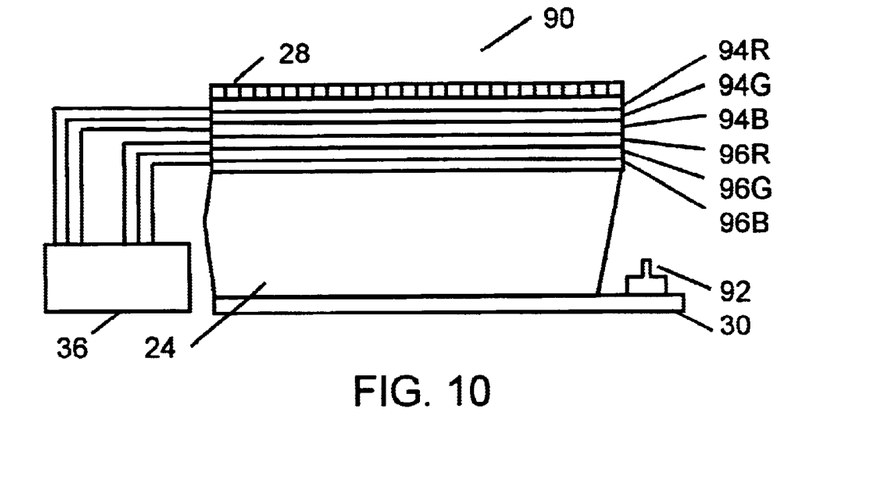
FIG. 10 is a side view of a third embodiment of a display system of the present invention configured for use as a color display.

In the embodiments described above, the image displayed on the display surface 28 is monochromatic and illuminated by white light. FIG. 10 illustrates a third embodiment, generally indicated at 90, which is configured for use with color displays or color sequential displays in which monochrome images are displayed in succession as red, green, and blue components of the final image and the display device 28 is illuminated sequentially by red, green, and blue light, corresponding to the image component being displayed. Light source 92 comprises red, green, and blue light sources, such as LED's or lasers. The light directing system comprises three independently switchable reflective holographic elements 94R, 94G, 94B, each operable to act upon wavelength bands in the red, green, or blue regions of the visible spectrum, respectively, and three independently switchable transmissive holographic optical elements 96R, 96G, 96B, each operable to act upon wave length bands in the red, green, or blue regions, respectively.

Figure 11:
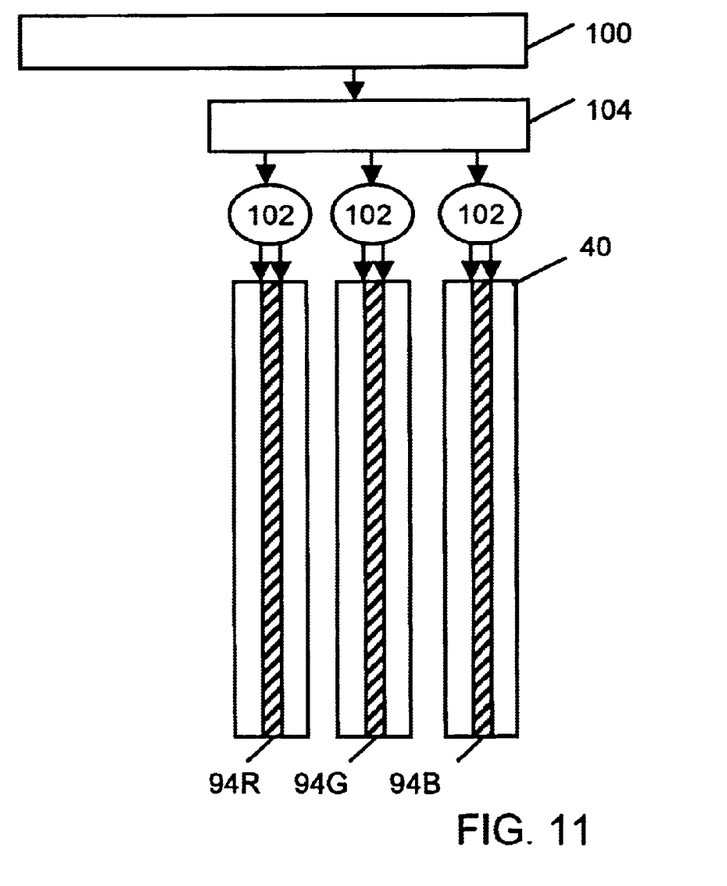
FIG. 11 is a schematic of a holographic device having three holographic optical elements each optimized to diffract red, green, or blue light, for use with the display system of FIG. 10.

Each holographic optical element 94R, 94G, 94B, 96R, 96G, 96B is holographically configured such that only a particular monochromatic light is diffracted by the hologram. The red optical elements 94R, 96R have a hologram which is optimized to diffract red light, the green optical elements 94G, 96G have a hologram which is optimized to diffract green light, and the blue optical elements 94B, 96B have a hologram which is optimized to diffract blue light. A holographic device controller 100 drives switching circuitry 104 associated with the electrodes 40 on each of the optical elements to apply a voltage to the electrodes (FIGS. 10 and 11). The electrodes 40 are individually coupled to the device controller 100 through a voltage controller 102 which selectively provides an excitation signal to the electrodes 40 of a selected holographic optical element to switch the hologram to its passive state. The voltage controller 102 also determines the specific voltage level to be applied to each electrode 40.

Preferably, only one pair of the electrodes 40 associated with one of the three holographic optical elements ((94R, 94G, 94B) or (96R, 96G, 96B)) is energized at one time. In order to display a color image, the voltage controller 102 operates to sequentially display three monochromatic images of the color input image. The electrodes 40 attached to each of the holograms are sequentially enabled such that a selected amount of red, green, and blue light is directed towards the viewer. For example, when a red monochromatic image is projected, the voltage controller 102 switches the green and blue holograms to the passive state by applying voltages to their respective electrodes 40. The supplied voltages to the electrodes 40 of the green and blue holograms create a potential difference between the electrodes, thereby generating an electrical field within the green and blue holograms. The presence of the generated electrical field switches the optical characteristic of the holograms to the passive state. With the green and blue holograms in the passive state and the red hologram in the diffractive state, only the red hologram optically diffracts the projected red image. Thus, only the portion of the visible light spectrum corresponding to the red light is diffracted to the viewer. The green hologram is next changed to the diffractive state by deenergizing the corresponding electrodes 40 and the electrodes of the red hologram are energized to change the red hologram to the passive state so that only green light is diffracted. The blue hologram is then changed to the diffractive state by deenergizing its electrodes and the electrodes of the green hologram are energized to change the green hologram to the passive state so that only blue light is diffracted.

More specifically, when display system 90 is operated in its ambient light mode, the transmissive holographic optical elements 96R, 96G, 96B, are deactivated and the reflective holographic optical elements 94R, 94G, 94B are activated selectively in rapid succession by the controller 100 in synchronism with the display device 28. When the display device 28 is displaying the red component of the final image, the element 94R is activated and the elements 94G and 94B are deactivated. The element 94R receives the ambient light passing through the display device 28 and reflects the light to the display surface as red light. Similarly, when the display device 28 is displaying the green component of the final image, the element 94G is activated and elements 94R and 94B are deactivated, such that display surface 28 is illuminated by green light reflected by the element 94G. When the display device 28 display the blue component of the final image, the element 94B is activated and elements 94R and 94G are deactivated, such that display surface 28 is illuminated by blue light reflected back from the element 94B.

When the display system 90 is operated in its internal illumination mode, the elements 94R, 94G, 94B are all deactivated and the controller 100 selectively activates the elements 94R, 94G, 94B in rapid sequence. When the display device 28 displays the red component of the final image the element 96R is activated and elements 96G and 96B are deactivated. The element 96R then directs red light from the light source 92 to the display device 28. When the display device 28 displays the green component of the final image, element 96G is activated while elements 96R and 96B are deactivated. The element 96G then directs green light from the light source 92 to the display surface. When the display device 28 displays the blue component of the final image, element 96B is activated while elements 96R and 96G are deactivated, and the display surface is illuminated by blue light transmitted from the light source 92 by the element 96B.

The holograms are sequentially enabled with a refresh rate (e.g., less than 150 microseconds) which is faster than the response time of a human eye so that a color image will be created in the viewer's eye due to the integration of the red, green, and blue monochrome images created from each of the red, green, and blue holograms. Consequently, the display device 28 will be illuminated sequentially by red, green, and blue lights so that the final viewable image will appear to be displayed as a composite color. The red, green, and blue holographic optical elements may be cycled on and off in any order. Additional optical components (not shown) may also be provided at the front or rear surface of the light guide 28 to generate desired optical characteristics in the red, green, and blue output beams.

The reflective holographic diffraction elements 94R, 94G, 94B have narrow bandwidth reflection characteristics. In order that the full visual bandwidth be utilized, it may be necessary to use a set of holographic subelements that operate over respective adjacent wavelength bandwidth and to activate the subelements in each set simultaneously. Since the electrodes used to switch the holograms introduce transmission losses, a single pair of electrodes is preferably used to simultaneously switch all of the subelements in each set. For example, subelements having holograms of adjacent bandwidths may be stacked or laminated between electrode coated substrates. The individual layers may be exposed separately on temporary substrates and peeled off the substrates after exposure. Thus, if red, green, and blue holograms are used, the sequence of layers may be, for example, substrate, ITO, red hologram a, red hologram b, red hologram c, ITO, substrate, substrate, ITO, green hologram a, green, hologram b, green hologram c, ITO, substrate, etc.

This problem is not encountered with the transmissive elements 96R, 96G, 96B since they have a broader bandwidth response. Accordingly, it is possible to cover the entire visual range with fewer layers. These layers are, however, sensitive to the polarization state of the light incident on the elements. In particular, the diffraction efficiency of the transmissive elements is considerably higher for p-polarized light than for s-polarized light. For example, the response to s-polarized light may be around 1% of that for p-polarized light. In order to make use of the full output of the light source, the display system may include optical filters which make use of both the p-polarized light and s-polarized light, such as disclosed in U.S. patent application Ser. No. 09/478,150, filed Jan. 5, 2000, (Attorney Reference No. 5454-00700/RDP029) which is incorporated herein by reference in its entirety. For example, pairs of holographic diffraction elements may be used with one element in the pair acting on the p-polarized component and the other acting on the s-polarized components. This may be achieved either by interposing a polarization rotator between the elements in the pair or by arranging for the interference fringes in the elements of each pair to be mutually crossed. If reflection holograms are used, these additional provisions are not required since reflection holograms only start to become polarization sensitive at large angles of incidence, typically much greater than 45 degrees. In the case where the holographic diffraction elements comprise Bragg holograms, the angular and wavelength selectivity of such holograms in many practical cases avoids cross-talk between the various wavelength bands. Under these circumstances, suitable illumination of the display device 28 may be achieved by using a broadband incoherent light source and using holographic diffraction elements that are not switchable.

FIG. 12 illustrates a fourth embodiment of the present invention. The display system, generally indicated at 120, comprises a reflective display device 128. A switchable transmissive holographic optical element 134 is interposed between the display device 128 and the light guide 24. The display device 128 and holographic optical element 134 are mounted on a rear face 140 of the light guide 24 with ambient light being incident upon a front face 142 of the light guide 24 (as indicated by arrow A'). When the transmissive holographic optical element 134 is in its active state, light from light source 22 is deflected into directions having a distribution centered around a vector extending generally perpendicular to the display surface of the display device 128, as shown in FIG. 12. Since the holographic optical element 134 is transmissive, it will be sensitive to the polarization state of the light and will deflect the p-polarized component to a much greater extent than the s-polarized component (which is generally reflected in the direction of arrows Y). The deflected p-polarized component is then reflected back to the element 134 by the display surface 128, with its polarization state altered in the process so that it is s-polarized. Since the holographic optical element 134 does not substantially alter the s-polarized light, the light will pass straight through the element, then through the light guide 24 and to the observer (as indicated by arrows B).

When the transmissive holographic optical element 134 is deactivated, all of the light from the light source 22 is essentially reflected in the direction of arrows Y. The ambient light incident in the direction of arrow A' now passes through element 134, is reflected by the display device 128 and passes back through element 134 on to the observer. The display system 120 thus operates in internal illumination mode when the transmissive holographic optical element 134 is activated and in ambient light mode when the element 134 is deactivated. Light source 22 may also be switched off when element 134 is deactivated. As described above with respect to the first embodiment, a third mode of operation is possible wherein the controller 36 rapidly switches the transmissive element 134 between its active and passive states so that the display surface is effectively illuminated by both ambient light and light from the dedicated light source 22. The display system 120 may also include a transmissive holographic optical element 132 positioned on the front face 142 of the light guide 24 to concentrate the ambient light onto the display device 128. The transmissive element 132 is switched by the controller 36 in synchronism with the holographic optical element 134 so that only one element is active at a time.

Figure 13:
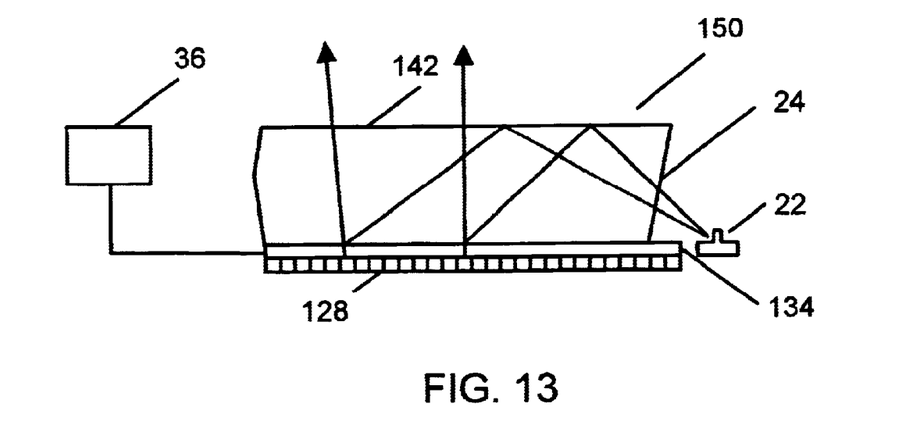
FIG. 13 is a side view of a fifth embodiment of a display system of the present invention having a reflective display device and a reflective surface disposed at a front surface of the light guide.

A fifth embodiment of the present invention is shown in FIG. 13 and generally indicated at 150. Light from the light source 22 is first totally internally reflected by the front face 142 of the light guide 24 prior to impinging upon holographic optical element 134. This arrangement enables light from the light source 22 to be incident upon the element 134 in a direction closer to a vector normal to the display surface of the display device 128. The light source 22 is mounted adjacent to the element 134 and faces generally towards the front face 142 of the light guide.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A display system comprising:
   a display device operable to display an image and configured for illumination by ambient light or light emitted by a dedicated light source, wherein the display device is disposed at the rear face of the light guide; and
   a light directing system operable to direct one of the ambient light and the light emitted by the light source towards the display surface and comprising at least one holographic element switchable between an active state wherein light incident on the element is diffracted and a passive state wherein light incident on the element is transmitted without alteration; and a light guide having a front face wherein light enters and a rear face.

2. The display system of claim 1 wherein the front face of the light guide is configured to reflect light having a first polarization state and transmit light having a second polarization state.

3. A display system comprising:
   a display device operable to display an image and configured for illumination by ambient light or light emitted by a dedicated light source; and a light directing system operable to direct one of the ambient light and the light emitted by the light source towards the display surface and comprising at least one holographic element switchable between an active state wherein light incident on the element is diffracted and a passive state wherein light incident on the element is transmitted without alteration; and
   a light guide having a front face wherein light enters and a rear face, wherein the rear face of the light guide has a reflective surface operable to reflect light received from the dedicated light source onto the display device.

4. The display system of claim 3 wherein the reflective surface and the light guide are configured to provide total internal reflection of the light emitted from the light source.

5. The display system of claim 3 wherein the reflective surface comprises a reflective holographic optical element.

6. A display system comprising:
   a display device operable to display an image and configured for illumination by ambient light or light emitted by a dedicated light source; and
   a light directing system operable to direct one of the ambient light and the light emitted by the light source towards the display surface and comprising at least one holographic element switchable between an active state wherein light incident on the element is diffracted and a passive state wherein light incident on the element is transmitted without alteration;
   a light guide having a front face wherein light enters and a rear face; and a diffuser disposed at the rear face of the light guide.

7. The display system of claim 6 wherein the diffuser is a holographic optical element.

* * * * *